UNITED STATES PATENT OFFICE.

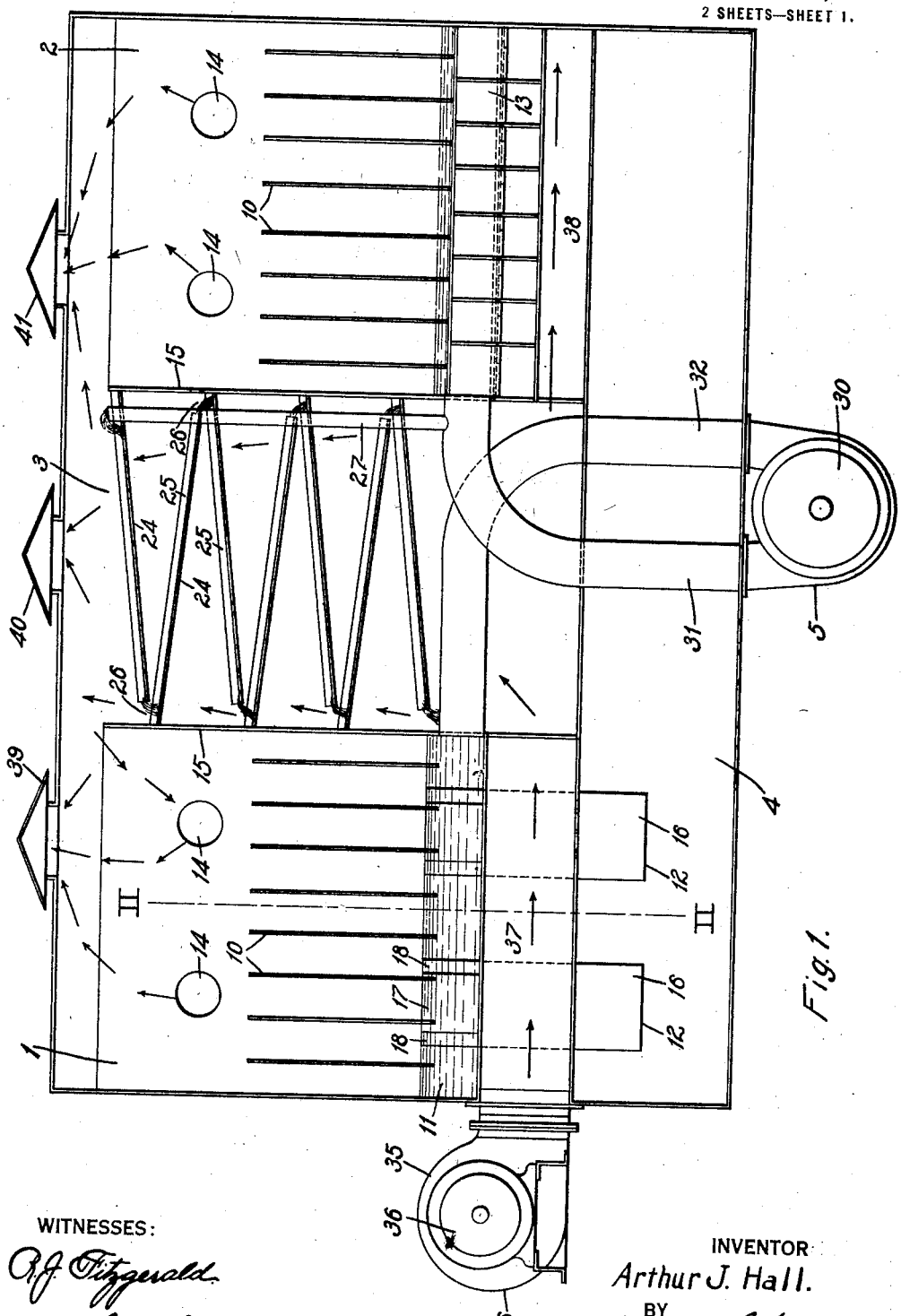

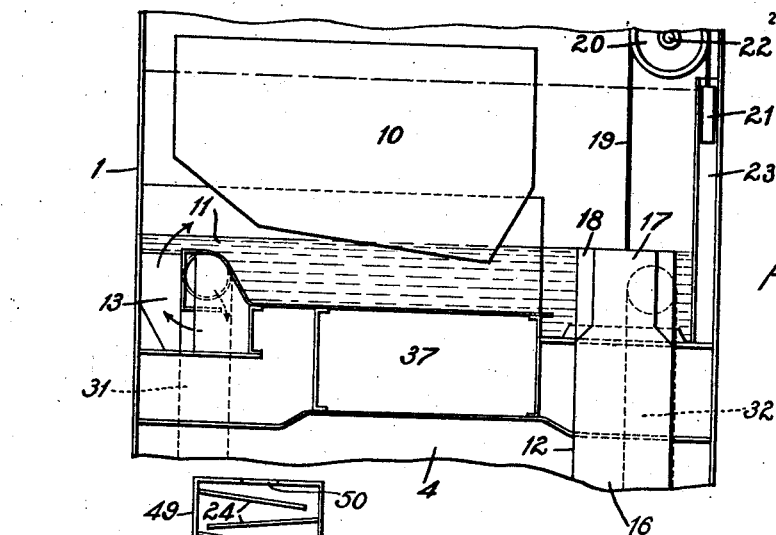
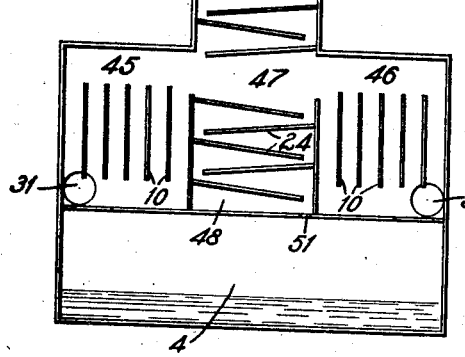
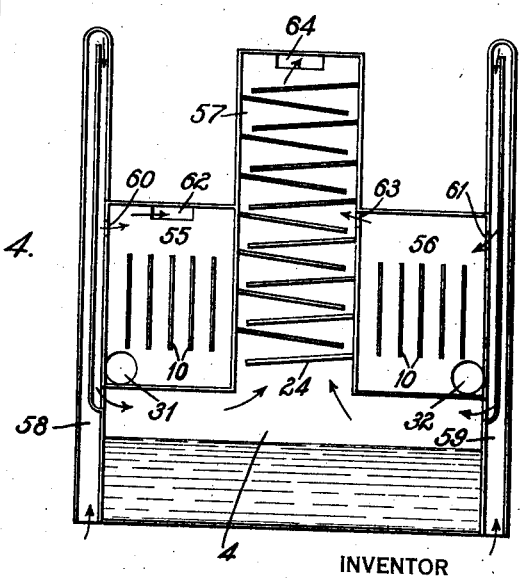

ARTHUR J. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,321,522.  Specification of Letters Patent.  Patented Nov. 11, 1919.

Application filed December 1, 1916. Serial No. 134,303.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Apparatus, of which the following is a specification.

My invention relates to control apparatus and it has special relation to a combined electrode-containing tank and cooling-tower structure for liquid rheostats and the like.

The object of my invention is to provide a unitary and relatively compact structure of the above-indicated character, whereby any steam that is generated in the rheostat will have free outlet to the atmosphere, and, furthermore, the electrolyte may be reduced in temperature to any desired degree.

More specifically stated, it is the object of my invention to provide a liquid rheostat comprising a plurality of electrode-containing compartments and a centrally-located cooling tower, together with means for circulating a portion of the electrolyte downwardly through the cooling tower and for circulating a ventilating air current, or other cooling medium, upwardly through the cooling tower and over the surfaces of the liquid in the compartments.

My invention may best be understood by reference to the accompanying drawings, wherein Figure 1 is a semi-diagrammatic view of a liquid rheostat constructed in accordance with my present invention, one side-wall being removed for purposes of clearness; Fig. 2 is a sectional view on the line II—II of Fig. 1; and Fig. 3 and Fig. 4 are views, similar to Fig. 1, of modifications of the invention.

Referring to Fig. 1 and Fig. 2 of the drawings, the structure shown comprises a liquid rheostat having a plurality of electrode-containing compartments or tanks 1 and 2 located near the respective ends of the rheostat, which is preferably of a rectangular form; and an intermediate, and, in this case, centrally located, cooling tower 3, together with a bottom discharge reservoir 4; an electrolyte-circulating pumping means 5; and an air-circulating device 6.

Each of tanks 1 and 2 is provided with a plurality of suitable electrodes 10 and contains a body of electrolyte 11 that just immerses the electrode tips when a plurality of discharge valves 12 occupy the illustrated positions, the liquid being admitted to each tank from the opposite end thereof through a suitable inlet weir 13.

The preferred arrangement locates the sets of discharge valves in diagonally opposite corners of the rheostat, while the inlet weirs 13 are positioned in the remaining corners, whereby the discharge valves 12 are shown in connection with the tank 1 and the inlet weirs 13 in connection with the tank 2. Each electrode-containing compartment is provided with one or more side ventilating apertures 14 that are located a predetermined distance above the maximum liquid level, for a purpose to be described. Suitable intermediate walls or partition members 15 serve to separate the electrode-containing compartments from the centrally-located cooling tower 3.

The discharge valve 12 is not of my present invention but is fully set forth and claimed in my copending application, Serial No. 873,919, filed Nov. 25, 1914. Essentially, it comprises a lower cylindrical portion 16 that is adapted to slidingly fit a bottom opening of the compartment and an upper cylindrical portion 17 of smaller diameter that is provided with a plurality of guiding ribs 18. Normally, each valve 12 occupies a position lower than that illustrated, whereby a continuous flow of electrolyte is discharged through the bottom tank openings around the upper cylindrical portions 17 into the reservoir 4. When the valve is raised, in a manner to be described, to the position shown, the bottom tank opening is filled by the lower valve portion 16, and the liquid consequently rises to the "flush-level," as illustrated, wherein the tips of the electrodes 10 are just immersed to initially complete any desired electrical circuit.

Any suitable actuating means for the valves 12 may be employed, that shown comprising a chain or cable 19 which passes over a sheave 20 to a counterweight 21 for the valve 12, the counterweight being housed in a suitable narrow compartment 23. The sheave 20 is mounted on a shaft 22 which may be rotated in any suitable manner. Inasmuch as the structure just outlined forms no material part of my present invention, except that it performs a certain necessary function in conjunction therewith, no further description is believed to be necessary.

The inlet weirs 13 extend across the entire width of each of tanks 1 and 2, liquid being received from the pumping means 5 at one end of each weir and being discharged through a bottom opening and thence, in a spiral path, into the electrode-containing compartment proper, as indicated by the arrows in Fig. 2. The preferred inlet-weir structure constitutes no part of my present invention and is fully described and claimed in a copending application of C. C. Whittaker, Serial No. 134,762, filed Dec. 2, 1916, and assigned to the Westinghouse Electric & Manufacturing Company.

The cooling tower 3 embodies a series of suitably-mounted inclined trays 24 severally having a plurality of vertically-extending partition or guiding members 25, the trays being arranged to discharge electrolyte from the lower end of each tray through an opening 26 to the upper end of the successive tray, in accordance with a familiar practice and as indicated in the drawing. A suitable vertically-extending inlet pipe 27 communicates with the pumping means 5, as more fully set forth hereinafter, and is adapted to discharge a portion of the working electrolyte to the top tray 24. The discharge from the lowest tray may be returned, in any suitable manner, to the reservoir 4, thereby serving to effect a certain reduction in temperature of the main body of electrolyte.

The pumping means 5 preferably comprises two motor-driven centrifugal pumps 30 that respectively communicate, through pipes 31 and 32, with the inlet weirs 13 of the respective electrode-containing compartments 1 and 2 and are suitably supplied from the reservoir 4, whereby a continuous flow of electrolyte is maintained.

For producing a suitable circulation of ventilating air, a blower 35, of any appropriate type, preferably driven by an electric motor 36, is provided to force a predetermined quantity of air through a central conduit 37, that is located between the containing tank 1 and the reservoir 4, and thence upwardly through the cooling tower 3, as indicated by the arrows. A similar conduit 38 is provided between the other tank 2 and the reservoir 4 to receive a portion of the ventilating air, although a second blower may, of course, be provided in communication with the conduit 38, if desired. The stream of air that is forced upwardly through the cooling tower 3 passes out of the rheostat through a plurality of top ventilating openings 39, 40 and 41 that are respectively located above the compartment 1, the cooling tower 3 and the other compartment 2. A further circulation of air is provided by the injector action of the air currents passing through the cooling tower, since a certain quantity of air is thereby drawn into the compartments 1 and 2 through the side apertures 14 and thence passes over the surface of the electrolyte and out of the top openings.

Thus, the air that is forced through the cooling tower 3 effects a certain reduction in the temperature of the working electrolyte and, in addition, cooling-air currents are brought into contact with the surfaces of the electrolyte in the compartments 1 and 2, whereby the necessary size of the cooling tower and the volume of liquid traversing it may be considerably less than would be required if such additional ventilating means were not utilized.

It will be appreciated that one of the desirable results of the above-described apparatus is the removal of the steam that is generated during active operation of the rheostats out of contact with the liquid, thereby tending to maintain the liquid at a lower temperature and also preventing the building up of steam pressure within the rheostat, which would require greater power for the operation of the pumps in providing the desired continuous flow of electrolyte.

Reference may now be had to Fig. 3, wherein the structure shown comprises a liquid rheostat having a plurality of side compartments 45 and 46 for the purpose of containing the electrodes 10 and to which liquid may be admitted through the inlet pipes 31 and 32, a centrally located cooling tower 47 and the bottom reservoir 4.

The cooling tower 47 comprises a lower portion 48 that is located directly between the electrode-containing compartments 45 and 46 and an upper portion 49 that extends a material distance above the compartments. The cooling tower 47 is preferably provided with a plurality of trays 24, and also has a top ventilating opening 50 and a bottom liquid-discharge opening 51 into the reservoir 4.

In the structure just described, no forced circulation of air is necessary to remove a certain amount of generated steam from the electrode-containing compartments, since they open directly into the cooling tower, and the steam will naturally tend to rise through the upper portion 49 of the cooling tower and pass out of the top opening 50.

Referring to Fig. 4, the liquid rheostat shown comprises a plurality of electrode-containing side compartments 55 and 56 and a centrally-located cooling tower 57, together with the bottom reservoir 4. A plurality of pipes or ventilating conduits 58 and 59, which may be suitably placed in communication with the previously-described blower 35, serve to conduct air through openings 60 and 61 in the side walls of the compartments 55 and 56. The conduits 58 and 59 also communicate with the top or air-space of the reservoir 4, into which the cooling tower 57 directly opens.

The compartment 55 is shown as provided with a top opening 62 to the atmosphere, while the other compartment 56 is illustrated as having a side opening 63 into the cooling tower 57, the cooling tower itself being provided with a suitable top ventilating opening 64. Either of the illustrated methods of removing the ventilating air from the electrode-containing compartments may be effectively employed.

In the present modification of the invention, the stream of ventilating air from each of the conduits 58 and 59 divides into two parts, one passing over the surface of the electrolyte in the corresponding compartments 55 and 56 and thence out through the openings 62 and 63, respectively, and the parts entering the bottom reservoir 4 thus coming into contact with the surface of the liquid contained therein, whence the combined stream from the conduits 58 and 59 passes upwardly through the cooling tower 57 and out through the top ventilating opening 64 thereof. Thus, an effective cooling system, in addition to the circulation through the tower 57, is provided, by reason of the passage of ventilating streams over the surfaces of the electrolyte in the various compartments of the rheostat.

I do not wish to be restricted to the specific structural details or arrangement of parts herein set forth, as further modifications thereof may be made without departing from the spirit and scope of my invention. I desire, therefore, that only such limitations shall be imposed as are indicated in the appended claims.

I claim as my invention:

1. A liquid rheostat comprising a plurality of electrode-containing compartments and an intermediate cooling tower for the liquid.

2. A liquid rheostat comprising a plurality of electrode-containing compartments and centrally-located means for causing the removal of steam generated during rheostatic operation.

3. The combination with a liquid rheostat having a plurality of electrode-containing compartments, of an intermediate cooling tower, and means for conducting a cooling medium over the liquid surface and through said cooling tower.

4. The combination with a liquid rheostat having a plurality of electrode-containing compartments, of an intermediate cooling tower, a common liquid reservoir located below said compartments, and air conduits positioned between said reservoir and said compartments and communicating with said cooling tower.

5. The combination with a liquid rheostat having a plurality of electrode-containing compartments, of an intermediate cooling tower, air conduits located below said compartments and communicating with said cooling tower, and means for circulating a current of air through said conduits and out of said cooling tower.

6. The combination with a liquid rheostat having a plurality of electrode-containing compartments, of an intermediate cooling tower having a series of inclined trays, a common liquid reservoir located below said compartments, air conduits positioned between said reservoir and said compartments and communicating with said cooling tower, means for circulating a portion of the electrolyte from the top to the bottom tray of the cooling tower, and means for circulating a current of air through said conduits and upwardly past the cooling-tower trays.

7. The combination with a liquid-rheostat tank, having a plurality of electrode-containing compartments severally provided with side apertures and having a plurality of top ventilating openings, of a cooling tower, air conduits located below said compartments and communicating with said cooling tower, and means for circulating a current of air through said conduits and said cooling tower and said top openings, whereby additional air currents are drawn through said side apertures over the liquid in said compartments and are expelled through said top openings.

8. A liquid rheostat comprising a plurality of electrode-containing compartments and centrally located means for cooling the liquid utilized by the rheostats.

9. A liquid rheostat comprising a plurality of electrode-containing compartments, an intermediate cooling tower, and means for conducting a cooling medium through said cooling tower.

In testimony whereof, I have hereunto subscribed my name this 24th day of Nov., 1916.

ARTHUR J. HALL.

Copies of this patent may be obtained for five cents each, by addressing the "Commissioner of Patents, Washington, D. C."